(12) United States Patent
Lei

(10) Patent No.: US 9,374,740 B2
(45) Date of Patent: Jun. 21, 2016

(54) METHOD FOR HANDING OVER A TERMINAL DURING A NON STEADY VOIP CALL, NETWORK ELEMENT, DEVICE AND SYSTEM

(75) Inventor: Zhengxiong Lei, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 582 days.

(21) Appl. No.: 13/388,125

(22) PCT Filed: Jul. 31, 2009

(86) PCT No.: PCT/CN2009/073023
§ 371 (c)(1),
(2), (4) Date: Jan. 31, 2012

(87) PCT Pub. No.: WO2011/011922
PCT Pub. Date: Feb. 3, 2011

(65) Prior Publication Data
US 2012/0127960 A1    May 24, 2012

(51) Int. Cl.
 H04W 4/00      (2009.01)
 H04W 36/00    (2009.01)
 H04W 36/14    (2009.01)

(52) U.S. Cl.
 CPC .......... *H04W 36/0022* (2013.01); *H04W 36/14* (2013.01)

(58) Field of Classification Search
 CPC ..................... H04W 36/0022; H04W 36/14
 USPC ................................................. 370/331, 332
 See application file for complete search history.

(56) References Cited

U.S. PATENT DOCUMENTS 8,565,163 B2    10/2013  Wan et al.
 2008/0267128 A1* 10/2008  Bennett et al. ............... 370/331

(Continued)

FOREIGN PATENT DOCUMENTS

CN    101083833 A    12/2007
 CN    101291537 A    10/2008

(Continued)

OTHER PUBLICATIONS

3GPP TS 23.216, v8.1.0, Single radio voice call continuity (SRVCC), Stage 2 (release 8), Sep. 2008.*

(Continued)

*Primary Examiner* — Peter Cheng
(74) *Attorney, Agent, or Firm* — Fay Sharpe, LLP

(57) ABSTRACT

The present invention provides a method for handing over a terminal from a packet switching domain to a circuit switching domain during a non steady state of a call, a network element managing service centralization and continuity, an access device, a network element managing mobility of a terminal, as well as a communication system at least comprising at least a terminal, a network element managing service centralization and continuity, an access device and a network element managing mobility of a terminal. The method comprises a first network element anchoring the call based on the call setup request received from the terminal, and storing a provisional response returned to the terminal and the state of the call; the terminal detecting that a handover is necessary and sending a measurement report to an access network; the access network deciding to request a second network element for handover, upon detection of a signaling bearer while the measurement report meets handover condition; the second network element deciding to send the first network element a PS to CS handover request upon detection of the signaling bearer, after receiving a request for handover from the access network; and after reception of said handover request, if the first network element detects that the call is in the non steady state, than it checks the previously stored provisional response and sends the provisional response to a third network element, whereby completing the session handover procedure and updating the remote end.

4 Claims, 5 Drawing Sheets

(56) References Cited

U.S. PATENT DOCUMENTS

2011/0035495 A1* 2/2011 Ekstrom et al. ............... 709/225
2013/0107865 A1* 5/2013 Diachina et al. .............. 370/331

FOREIGN PATENT DOCUMENTS

| CN | 101335982 A | 12/2008 |
|---|---|---|
| CN | 101459940 A | 6/2009 |
| JP | 2008-199475 | 8/2008 |
| WO | WO 2009/071702 A1 | 6/2009 |

OTHER PUBLICATIONS

3$^{rd}$ Generation Partnership Project, "Technical Specification Group Services and System Aspects; Single Radio Voice Call Continuity (SRVCC); Stage 2 (Release 8)," 3GPP TS 23 216 V8.1.0, Sep. 2008.
International Search Report for PCT/CN2009/073023 dated May 6, 2010.
3$^{rd}$ Generation Partnership Project, "Technical Specification Group Services and System Aspects; Single Radio Voice Call Continuity (SRVCC); Stage 2 (Release 8)," 3GPP TS 23.216 V8.4.0, Jun. 2009.
Japanese Office Action dated Aug. 6, 2013.
Nokia Siemens Networks, et al., "QCI and SRVCC", TD S2-086788, 3GPP TSG SA WG2 Meeting #68, Qing Dao, China, Oct. 13-17, 2008, pp. 1-3.
3$^{rd}$ Generation Partnership Protect; Technical Specification Group Services and System Aspects; IP Multimedia System (IMS) service continuity enhancements; Service, policy and interaction; Stage 2, (Release 9), 3GPP TR 23.838 V9.0.0, Sophia-Antipolis Cedex, France, Jun. 11, 2009, pp. 1-51.
Nokia, et al., "SRVCC Alerting State", S2-093505, 3GPP TSG SA WG2 Meeting #73 Tallinn, Estonia, May 11-15, 2009.
3$^{rd}$ Generation Partnership Protect; Technical Specification Group Services and System Aspects; Single Radio Voice Call Continuity (SRVCC); Stage 2, (Release 9), 3GPP TS 23.216, V9.0.0, Sophia-Antipolis Cedex, France, Jun. 8, 2009, pp. 1-39.
European Search Report dated Jun. 24, 2014.

* cited by examiner

METHOD FOR HANDING OVER A TERMINAL DURING A NON STEADY VOIP CALL, NETWORK ELEMENT, DEVICE AND SYSTEM

FIELD OF THE INVENTION

The present invention relates to the field of communications, and more particularly to handing over a terminal during a non steady state of a VoIP call.

BACKGROUND OF THE INVENTION

It has been defined in 3GPP TS 23.216 how to support single radio voice call continuity (SRVCC) while a call/session is in a steady state, i.e. the user being active in an IMS session using PS (Packet Switching) media flow(s) at the time of initiation of Access Transfer to CS (Circuit Switching).

FIG. 1 show, as an example, a SRVCC network architecture provided in 3GPP TS 23.216. As shown in FIG. 1, the UE accesses the IMS via E-UTRAN, S-GW/PDN GW. The E-UTRAN, also known as LTE (Long Term Evolution), comprises a number of E-NodeBs responsible for the radio access network. The EPS is simplified as two type of network element: eNodeB and EPC, by merging functionally the NodeBs. RNCs and CNS of the existing WCDMA and TD-SCDMA systems.

The so-called EPS includes EPC (Evolved Packet Core, i.e. the core network), E-UTRAN (also known as LTE) and UE. The EPC comprises: MME (Mobility Management Entity) for acting as controlling node and responsible for signaling processing of the core network; S-GW (Serving GateWay)/PDN-GW (Packet Data Network GateWay) responsible for data processing of the core network, wherein a non 3GPP radio access network may access the EPC via the PDN-GW and a 3GPP radio access network may access EPC via the S-GW.

In addition, FIG. 1 also shows the interface between network elements proposed by this specification. For example, E-UTRANs and EPCs are mutually connected via S1 (similar to Iu) interfaces, E-UTRANs are mutually connected via X2 (similar to Iur) interfaces (non shown), and UEs and E-UTRANs are mutually connected via LTE-Uu interfaces.

In an environment as shown in FIG. 1, a decision as to handing over an UE to the circuit switching domain provided by UTRAN (UMTS Terrestrial Radio Access Network)/GERAN (GSM/EDGE Radio Access Network) could be made, when the UE is at the edge of the coverage of the E-UTRAN or outside of the coverage. In the UTRAN/GERAN, the UE accesses to the IMS network via a base station, a MSC (Mobile Switch Center) server.

The UTRAN is a rather new access network for UMTS and becomes currently an important access way of the UMTS, and may include NodeB, RNC (Radio Network Controller), CN (Core Network) etc.; the GERAN is a key portion of the GSM drawn up and maintained by the 3GPP and is also included in the UMTS/GSM network, and includes a base station BS and a Base Station Controller and their interfaces (e.g. Ater interface, Abis interface, A interface etc.). In general, the mobile operator network is composed of a number of GERANs, which are combined with the UTRAN in the UMTS/GSM networks.

More details about the other network elements in FIG. 1 and the communicating manner therebetween may refer to TS 23.216.

FIG. 2 shows, as an example, the flow of concerned calls from the E-UTRAN to a target GERAN. In order to complete handover of a voice session, the voice call should be anchored in advance for example at the SCC AS (Service Centralization and Continuity Application Server) in the IMS.

As shown in FIG. 2, the source E-UTRAN will send a handover request to a local MME when it decides to hand over an ongoing VoIP call of a local UE from the PS domain to the CS domain based on measurement report received from the local/source UE. Then, the source MME will split the bearer (for subsequent handover of voice service) and send a corresponding handover request from the PS domain to the CS domain to a MSC server or media gateway currently capable of covering the local UE. The corresponding MSC/media gateway will initiate a session handover after having prepared for handover and established a circuit. Herein, it should be noted that the steps 6-9 of the dashed portion (and also steps 20-21) may be omitted in case that the target MSC to which the local UE is to handover is the same one as the MSC receiving the handover request from the MME.

In the following steps (i.e. after step 10). FIG. 2 shows two handover procedures of user layer:
  A session handover procedure of IMS layer (at a remote UE, i.e. the other party setting up a VoIP session with a local UE) (steps 11-12). More particularly, the session handover procedure is performed by the SCC AS in the IMS, and then the remote UE is updated by the SDP (Session Description Protocol) of the target CS access leg, and the source EPC PS access leg is released. The above steps would cause the voice portion of the ongoing session to be handed over from the EPC to the MGW at the user layer.
  A handover procedure to a target cell at layer 2 (handover from the E-UTRAN to the GSM performed at the local UE and the access network, steps 15-21), which is a handover between RATs performed at the local UE and the access network.

More details about the steps of FIG. 2 may refer to 3GPP TS 23.216.

However, it is not indicated in the 3GPP TS 23.216 how to support SRVCC during a non steady state of a session. The non steady state may mean the earlier state of a session, for example the calling party receiving a provisional SIP response message (except a 100 Trying message) but not a 200 OK message.

Therefore, a mechanism capable of supporting the SRVCC handover from the PS domain to the CS domain during a non steady state of a session is needed.

SUMMARY OF THE INVENTION

To solve the above problem in the prior art, according to an aspect of the present invention, a method for handing over a terminal from a packet switching domain to a circuit switching domain during a non steady state of a call is proposed. The method comprises: a first network element anchoring the call based on the call setup request received from the terminal, and storing a provisional response returned to the terminal and the state of the call; the terminal detecting that a handover is necessary and sending a measurement report to an access network; the access network deciding to request a second network element for handover, upon detection of a signaling bearer while the measurement report meets handover condition; the second network element deciding to send the first network element a PS to CS handover request upon detection of the signaling bearer, after receiving a request for handover from the access network; and after reception of said handover request, if the first network element detects that the call is in the non steady state, then it checks the previously stored provisional response and sends the provisional response to a third network element, whereby completing the session handover procedure and updating the remote end.

According to another aspect of the present invention, a network element managing service centralization and continuity is proposed, which is capable of handing over a terminal from a packet switching domain to a circuit switching domain during a non steady state of a call. The network element comprises: storing means for storing a provisional response returned to the terminal and the state of the call after the call is anchored based on the call setup request received from the terminal; and provisional response checking and sending means for checking the previously stored provisional response and sending the provisional response to another network element in case that the call is detected to be in the non steady state, upon reception a handover request from yet another network element.

According to further another aspect of the present invention, an access device is proposed, which is capable of handing over a terminal from a packet switching domain to a circuit switching domain during a non steady state of a call. The access device comprises: deciding means for deciding to request another network element for handover, upon detection of a signaling bearer while a measurement report received from the terminal meets handover condition.

According to further another aspect of the present invention, a network element managing mobility of a terminal is proposed, which is capable of handing over a terminal from a packet switching domain to a circuit switching domain during a non steady state of a call. The network element comprises: deciding means for deciding to send another network element a PS to CS handover request upon detection of a signaling bearer, after receiving a request for handover from an access network.

According to further another aspect of the present invention, a communication system is proposed, comprising at least: at least a terminal; a network element managing service centralization and continuity according to the present invention; an access device according to the present invention; and a network element managing mobility of a terminal according to the present invention.

BRIEF DESCRIPTION OF THE DRAWINGS

These and many other features and advantages of the present invention will become apparent from the following description of the embodiments of the present invention with reference to the drawings, wherein.

DETAILED DESCRIPTION OF THE INVENTION

Figure 1:
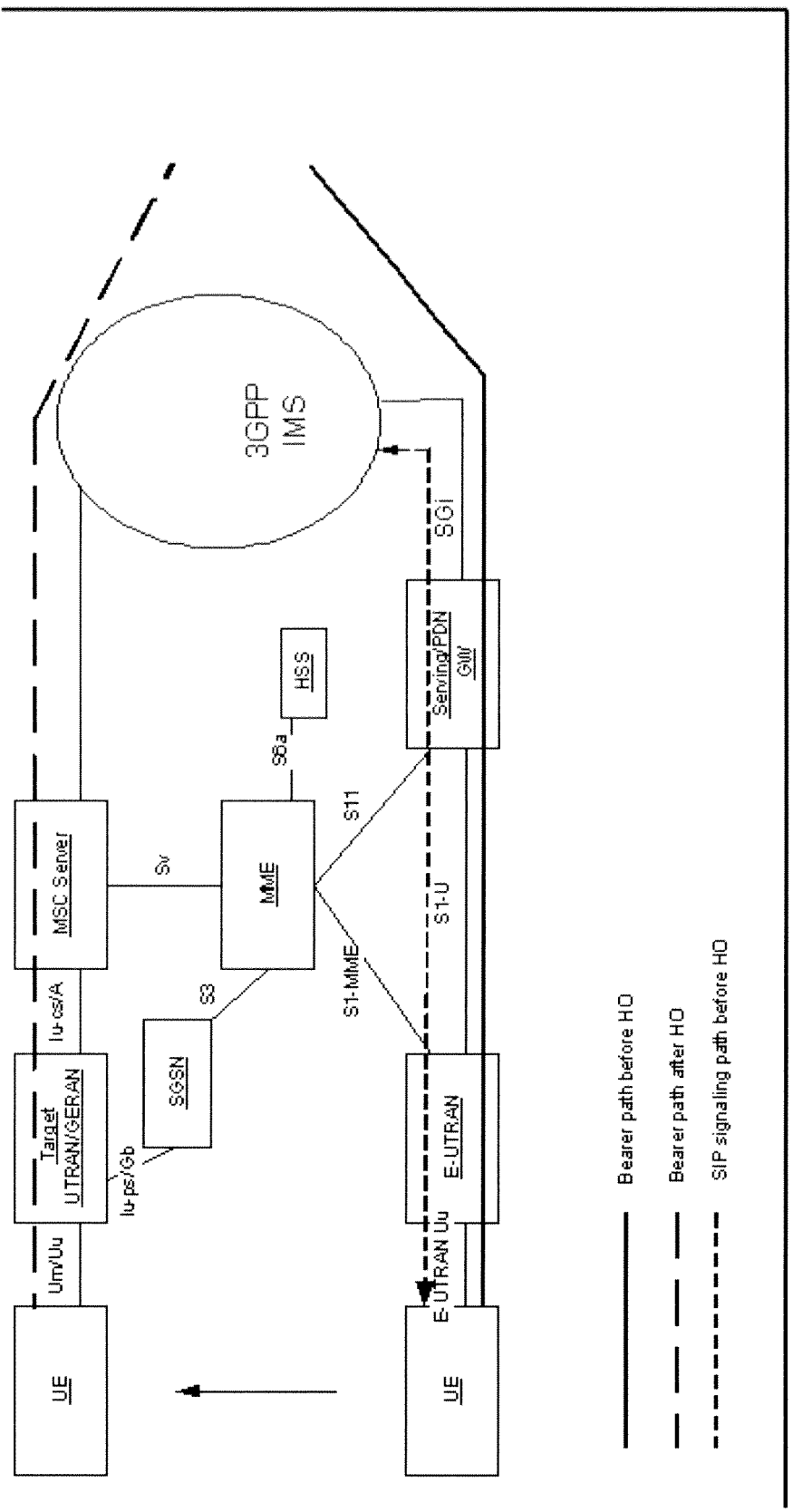
FIG. 1 shows, as an example, a network architecture for SRVCC provided in 3GPP TS 23.216.

The present invention is intended to perform the SRVCC handover from the E-UTRAN to the GERAN/UTRAN in case that a VoIP call is still under a non steady state, in which an example of the non steady state is the earlier state of a call.

Thus, the basic idea of the present invention is to enable the mobility management entity (MME) and eNodeB to initiate the SRVCC handover procedure upon detection of presence of the IMS signaling bearer (QCI (Quality Class Identifier)=5). That is to say, the MME will send a request for SRVCC PS to CS handover to the mobile switch center (MSC) server upon detection of presence of the IMS signaling bearer, even though the voice bearer does not exist (QCI=1). The MSC server will initiate a session handover procedure to the IMS and the SCC AS after having received the request for SRVCC PS to CS handover. Then, the SCC AS will respond to the MSC server based on the state of the access leg and the previous response sent from the SCC AS to the local terminal (this response being preserved in advance by the SCC AS). The SCC AS will complete the session handover, update the remote end and release the original access leg after having sent the response to the MSC server.

It should be noted that, the MSC server may be connected to the IMS/SCC AS by means of the following two manners:

1. if the MSC server supports the I2/I1 interface to the CSCF/SCC AS, then the MSC sever will be connected to the IMS/SCC AS directly via the I2/I1 interface;

2. if the MSC server does not support the I2/I1 interface to the CSCF/SCC AS, then the MSC sever will be connected to the IMS/SCC AS via the MGCF/MGW.

However, the present invention is applicable to either of the two manners. For simplicity, the first manner will be described below. However, the present invention is also applicable to the second manner and the call procedure of the second manner is similar to that of the first one, It should be noted that, in the present invention, it is necessary to slightly modify the eNB, MME and SCC AS as follows.

The SCC AS should be enhanced so that the state of the access leg and the previous response sent from the SCC AS to the calling party can be preserved. If the SCC AS has sent a 180 Ringing SIP message in the access leg to the calling party, then it should preserve this response. In addition, the SCC AS should send an appropriate response to the MSC server based on the state of the access leg and the previously preserved response, after having received a request for initiating a session handover from the MSC server.

The MME should be enhanced so that the IMS signaling bearer can be detected and a SRVCC request can be sent to the MSC server based on the local policy.

The E-UTRAN should be enhanced so that a SRVCC handover can be initiated upon detection of presence of the IMS signaling bearer.

Optionally, if the provisional response sent by the SCC AS is a 180 Ringing SIP message, then the MSC server should have the capability of commanding the MGW to play a ring tone for the calling party.

Figure 3:
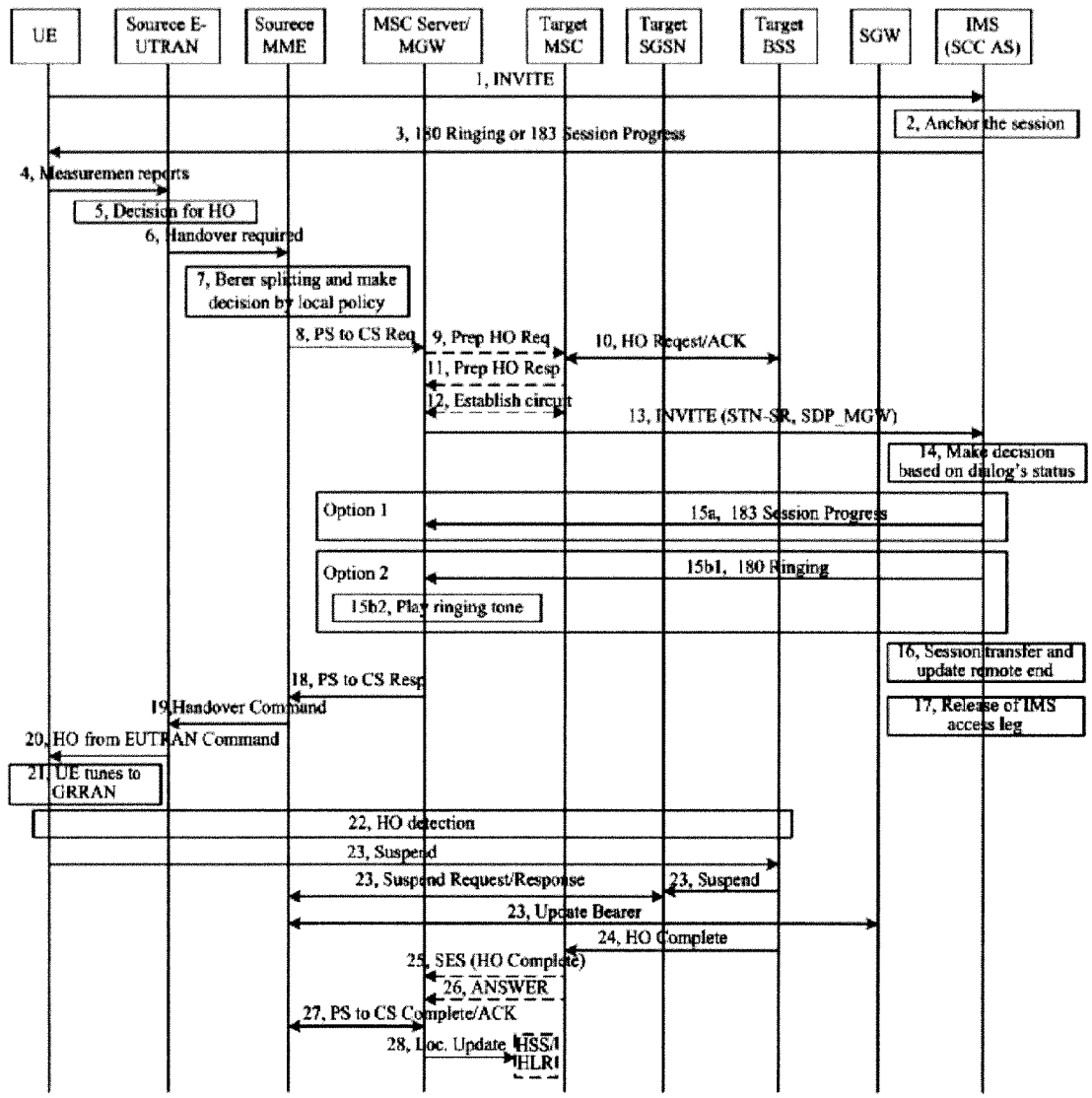
FIG. 3 shows, as an example, a signaling flow of SRVCC handover from the E-UTRAN to the GERAN/UTRAN under a non steady call state according to the present invention.

FIG. 3 shows the signaling flow of the SRVCC handover of a call/session during a non steady state.

It should be noted that, herein, the session handover request sent by the MGW to the SCC AS may be an ISUP message or a SIP message according to the capability of the MSC server. The present invention is applicable either to the ISUP or to the SIP. For simplicity, the SIP message is taken as an example herein for illustration.

In step 1, the local UE sends an INVITE request to the IMS and SCC AS. This request is forwarded to the S-CSCF (not shown) according to a normal IMS session establishment procedure. This request is forwarded to the SCC AS by using iFC (initial Filter Criteria) service logic.

In step 2, the SCC AS anchors this session for implementing a handover.

In step 3, the SCC AS sends a provisional response to the UE. Herein, the provisional response is for example a 180 Ringing or a 183 Session Progress SIP message.

In step 4, the local UE detects that a handover from the E-UTRAN to the GERAN-UTRAN may be needed and sends a measurement report to the E-UTRAN.

Figure 2:
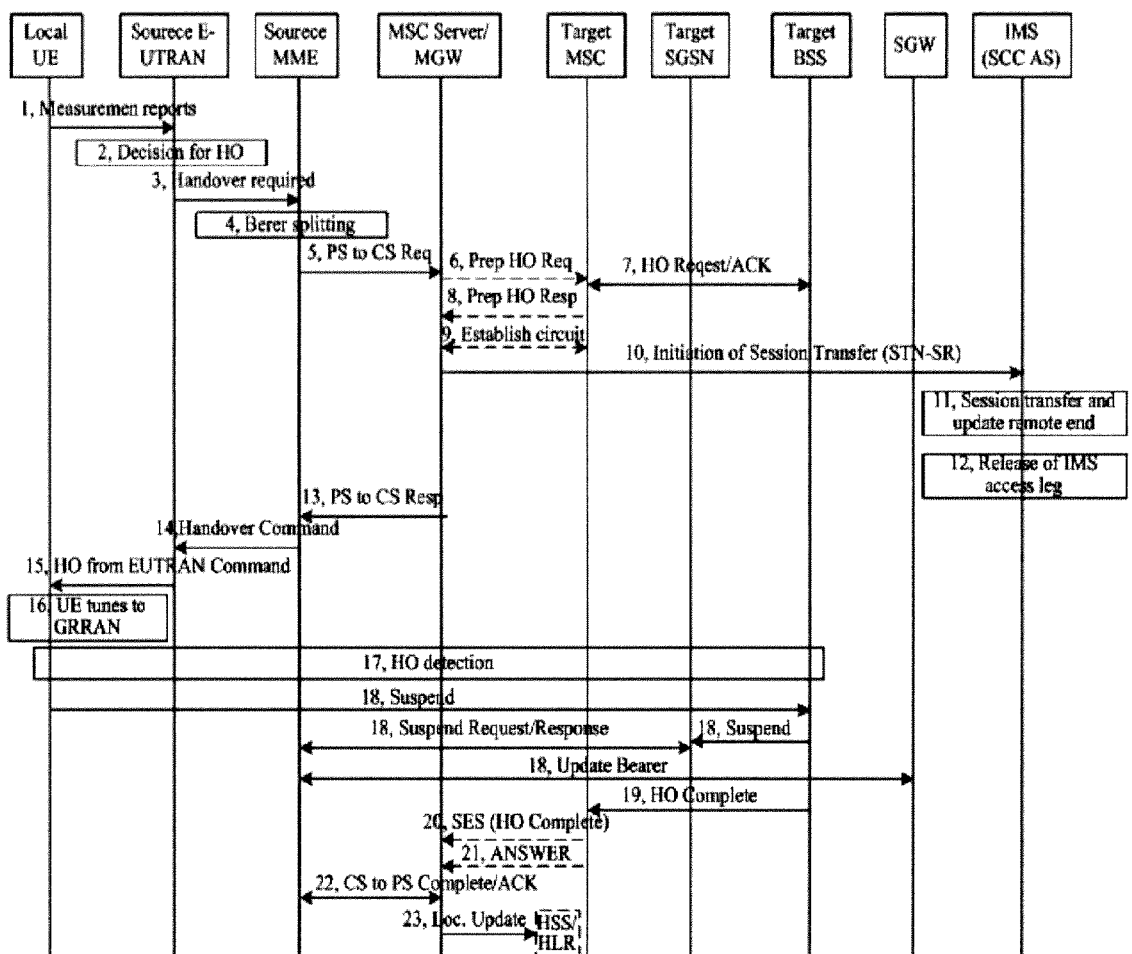
FIG. 2 shows, as an example, a signaling flow of SRVCC handover from the E-UTRAN to the GERAN/UTRAN according to the prior art.

In step 5, based on the UE's measurement report, and possibly based on an indication of "SRVCC operation possible", the source E-UTRAN decides to trigger a SRVCC handover to the GERAN upon detection of presence of a QCI=5 bearer (IMS signaling) or a QCI=1 bearer (IMS voice) set up for this UE, which is different from the signaling flow shown as in FIG. 2. Herein, a decision as to triggering a handover could be made based on presence of an IMS signaling bearer, whereby a SRVCC handover procedure of a call/session during a non steady state can be implemented.

In step 6, the source E-UTRAN sends a handover request (Handover Required) message to the source MME and indicates the source MME that it is a SRVCC handover operation.

In step 7, the source MME checks concerned QCI and the type of generic container. If a voice bearer (QCI=1) exists and the type of container indicates a SRVCC handover, then the MME performs the same process as step 4 of FIG. 2 (i.e. the MME will split the voice bearer from the non voice bearers and prepare to initiate the PS-CS handover procedure towards MSC Server). If the type of container indicates a SRVCC handover but the voice bearer does not exist, then according to the present invention, the MME will further check whether an IMS signaling bearer (QCI=5) exists or not. If the IMS signaling bearer exists, then the MME may prepare to initiate a PS-CS handover procedure based on the operator's local policy stored in the MME. Herein, suppose that the operator's local policy permits the MME to initiate a PS-CS handover procedure in case that the IMS signaling bearer exists but the voice bearer does not exist. Therefore, the MME will send a SRVCC PS-CS request to the MSC server.

Steps 8-12 are identical to steps 5-9 of FIG. 2. More details may refer to 3GPP TS 23.216 and herein would not be detailedly explained unnecessarily.

In step 13, the MSC server initiates a session handover by sending to the IMS an INVITE message having the SDP information of the STN-SR (Session Transfer Number—Single Radio) and the MGW. The STN-SR indicates that a SRVCC procedure will be adopted for the PS-CS handover.

In step 14, the SCC AS finds the anchored session based on the STN-SR. Then, the SCC AS detects that the access leg is under a non steady state, i.e. the call being in earlier state. Afterwards, the SCC AS checks the previous preserved SIP provisional response and sends a corresponding response to the MSC server. For example, if the preserved response is a 180 Ringing, then the SCC AS will send a 180 Ringing message to the MSC server. If the preserved response is a 183 Session Progress message, then the SCC AS will send a 183 Session Progress message to the MSC server. However, it should be understood that, if the SCC AS detects that the access leg is under a steady state, then it will operate according to the original SRVCC procedure.

Step 15 illustrates two exemplary choices, i.e. 183 Session Progress message and 180 Ringing message. In case of 180 Ringing message, the MSC server will play a ring tone to the calling party. However, it should be understood that, the present invention is not limited to these two messages but may also use other response messages for the non steady state.

In step 16, the SCC AS continues completing the session handover procedure and then updates the remote end. However, it should be noted that, in the present invention, the UPDATE message is the only one choice since the session is under a non steady state.

In step 17, since the original access leg is under a non steady state, the SCC AS will send a CANCEL message but not a BYE message to release the access leg.

It should be noted that, although FIG. 3 is only directed to the case that the local UE is the calling party, the present invention is also applicable to the case that the local UE is the called party, and the signaling flow is similar to that of FIG. 3. For simplicity, unnecessarily detailed description thereof will not be given out any more herein.

In this way, by applying the solution of the present invention, a SRVCC handover procedure can be implemented even during a non steady state of a call/session, which is undoubtedly an enhancement for the original SRVCC solution.

The method for handing over a terminal from the E-UTRAN (PS domain) to the UTRAN/GERAN (CS domain) during a non steady state of a VoIP call according to an embodiment of the present invention will be described in the following with reference to FIG. 4. The method of the present embodiment may be applicable to for example the network architecture as shown in FIG. 1. The description about such network architecture will not be repeated herein.

Figure 4:
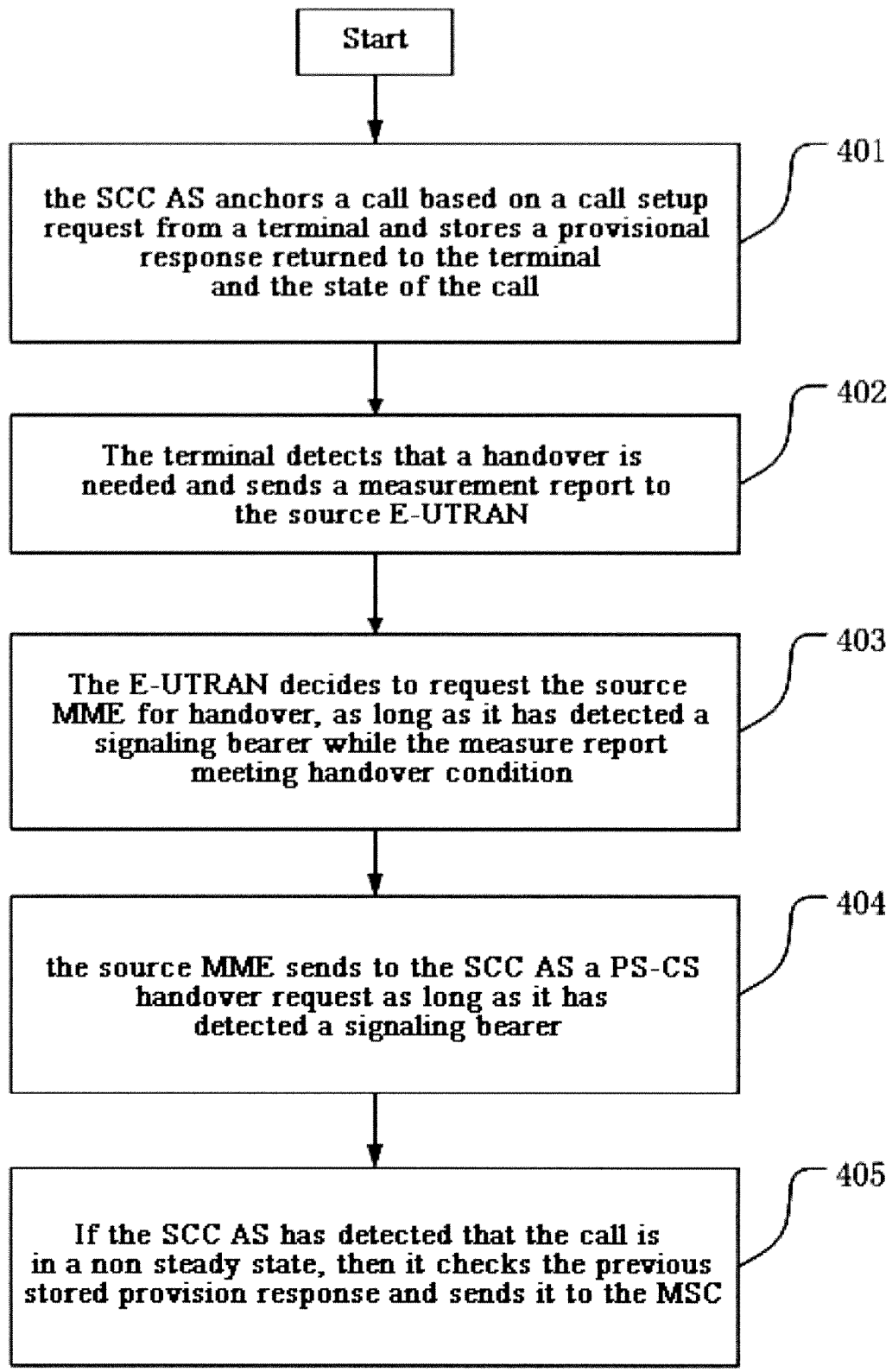
FIG. 4 is a flowchart of the method for performing a SRVCC handover under a non steady call state according to an embodiment of the present invention.

As shown in FIG. 4, firstly, in step 401, a first network element anchors the call based on the call setup request received from the terminal, and stores a provisional response returned to the terminal and the state of the call. Herein, the first network element may be for example the SCC AS of FIG. 3, the terminal may be for example the local UE of FIG. 3, the call setup request may be for example an INVITE message conforming to the SIP protocol, and the provisional response may be for example a 180 Ringing message or a 183 Session Progress message conforming to the SIP protocol. Furthermore, it should be noted that, the state of a call means the earlier state of a call in the present embodiment, i.e. a state when a call has not been set up completely successfully. More particularly, according to the present embodiment and with reference to FIG. 3, the local UE sends an INVITE message to the SCC AS to request for setting up a call. After having received the INVITE message, the SCC AS anchors the call, sends to the local UE a 180 Ringing message or a 183 Session Progress message, and preserves the sent provisional response message and the sate of the access leg.

Next, in step 402, the terminal detects that a handover is necessary and sends a measurement report to an access network. Herein, the access network may be for example the source E-UTRAN of FIG. 3. More particularly, according to the present embodiment and with reference to FIG. 3, the local UE detects that a SRVCC handover from the E-UTRAN to the GERAN-UTRAN may be necessary, and thus sends a measurement report to the source E-UTRAN.

Then in step 403, the access network decides to request a second network element for handover, upon detection of a signaling bearer while the measurement report meets handover condition. Herein, the second network element may be for example the source MME as shown in FIG. 3. Furthermore, in the present embodiment, detection of a signaling bearer means a QCI=5 bearer established for the UE. More particularly, according to the present embodiment and with reference to FIG. 3, based on the UE's measurement report, and possibly based on an indication of "SRVCC operation possible", the source E-UTRAN may decide to trigger a SRVCC handover to the GERAN upon detection of presence of a signaling bearer.

It should be noted that, upon detection of a voice bearer, the source E-UTRAN will also decide to trigger a SRVCC handover to the GERAN, the handover conforming to the normal SRVCC handover procedure. A detailed process may refer to the 3GPP TS 23.216 and will not be described detailedly unnecessarily.

Next, in step 404, the second network element decides to send the first network element a PS to CS handover request upon detection of the signaling bearer, after having received a request for handover from the access network. Herein, the handover request may be for example an INVITE message conforming to the SIP protocol and having information indicating using single radio voice call continuity handover and call parameters, wherein the information indicating using single radio voice call continuity handover may be for example a STN-SR indicating using the SRVCC procedure for the PS-CS handover, and said call parameters may be for example the SDP from a media gateway. More particularly, according to the present embodiment and with reference to FIG. 3, when the source MME has received a handover request from the source E-UTRAN, it will check its preserved type of generic container. If the type of container indicates a SRVCC handover, then a PS-CS SRVCC handover procedure may be initiated based on the operator's local policy as long as a signaling bearer (QCI=5) is detected, i.e. an INVITE message having the SDP of the STN-SR and the MGW being sent to the SCC AS. In the present invention, suppose that the operator's local policy permits the MME to initiate a PS-CS SRVCC handover procedure in case that the IMS signaling bearer exists but the voice bearer does not exist.

It should be noted that, in the prior art, the particular process of step 404 may be carried out for example as follows. The MME sends a SRVCC PS-CS request to the MSC server. The MSC server prepares to hand over and establish a circuit, and then initiates a session handover through sending to the SCC AS an INVITE message having the SDP information of the STN-SR and the MGW. However, it should be understood that, the present invention is not limited to the above process, and any interaction between the MME and the SCC AS for implementing handover could be conceived by a person skilled in the art.

Finally, in step 405, after reception of said handover request, if the first network element detects that the call is in a non steady state, then it checks the previously stored provisional response and sends the provisional response to a third network element, whereby completing the session handover procedure and updating the remote end. Herein, the third network element may be for example the MSC server as shown in FIG. 3. More particularly, according to the present embodiment and with reference to FIG. 3, the SCC AS finds the anchored session based on the STN-SR. Then, the SCC AS detects that the access leg is under a non steady state, i.e. the earlier state of call. Afterwards, the SCC AS checks the previously stored SIP provisional response and sends a corresponding response to the MSC server. For example, if the stored response is a 180 Ringing, then the SCC AS will send a 180 Ringing message to the MSC server; if the stored response is a 183 Session Progress message, then the SCC AS will send a 183 Session Progress message to the MSC server. If it is the case of 180 Ringing message, then the MSC server will play a ring tone to the calling party. However, it should be understood that, the present invention is not limited to these two messages, but can adopt other response messages for the non steady state. Then, the SCC AS continues completing the session handover procedure and updates the remote end.

It should be noted that, although it is specified in the 3GPP TS 23.237 that an UPDATE or re-INVITE message can be used to update the remote end, the UPDATE message is the only one choice in the present invention since the session is under the non steady state.

It should also be noted that, since the original access leg is in the non steady state, the SCC AS sends a CANCEL message but not a BYE message to release the access leg.

Although the above description is only directed to the case that the local UE is the calling party, the present embodiment is also applicable to the case that the local UE is the called party and the method process is similar to the above described process. For simplicity, the description thereof will not be repeated herein.

It can be there for seen that, by using the solution of the present invention, the SRVCC handover procedure may also be implemented when a call/session is in a non steady state, which enhances the original SRVCC solution.

Based on the same inventive concept, according to another aspect of the present invention, a network element managing service centralization and continuity is proposed, which is capable of handing over a terminal from a packet switching domain to a circuit switching domain during a non steady state of a call. The network element managing service centralization and continuity will be described in the following with reference to FIG. 5.

Figure 5:
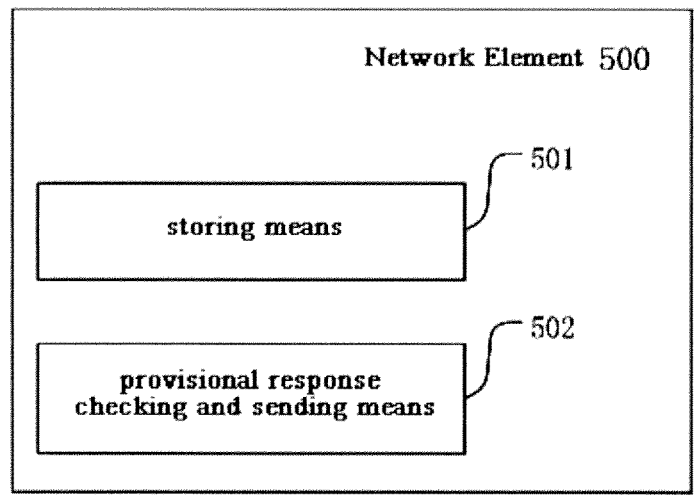
FIG. 5 is a block diagram of the network element according to an embodiment of the present invention.

FIG. 5 shows the network element 500 managing service centralization and continuity according to an embodiment of the present invention. The network element 500 includes storing means 501 and provisional response checking and sending means 502. The storing means 501 is configured to store a provisional response returned to the terminal and the state of the call after the call is anchored based on the call setup request received from the terminal. For example, upon reception of an INVITE message from the UE, the SCC AS anchors the call and sends a 180 Ringing or 183 Session Progress message to the UE. Then, the storing means 501 stores the message sent to the UE and the state of the access leg. The provisional response checking and sending means 502 is configured to check the previously stored provisional response and send the provisional response to another network element (the MSC server) in case that the call is detected to be in the non steady state, upon reception a handover request from yet another network element (the source MME). For example, when the SCC AS has received from the source MME an INVITE message including the SDP of the STN-SR and MGW and detected that the access leg is under an non steady state, the provisional response checking and sending means 502 checks the previously stored 180 Ringing or 183 Session Progress response message and sends the corresponding response message to the MSC server.

In implementation, the network element 500 of this embodiment as well as the storing means 501 and provisional response checking and sending means 502 it includes, may be implemented in software, hardware or a combination of them. For example, those skilled in the art are familiar with a variety of devices which may be used to implement these components, such as micro-processor, micro-controller, ASIC, PLD and/or FPGA etc. Those respective components of the network element of the present embodiment may be implemented separately physically but interconnected operatively.

In operation, the network element 500 managing service centralization and continuity of the embodiment illustrated in connection with FIG. 5, may implement the above described method for handing over a VoIP call from PS to CS during a non steady state of the VoIP call. By using this network element 500, the SRVCC handover procedure may be implemented during a non steady state of a call/session, thus enhancing the original SRVCC solution.

Based on the same inventive concept, according to another aspect of the present invention, an access device is proposed, which is capable of handing over a terminal from a packet switching domain to a circuit switching domain during a non steady state of a call.

Figure 6:
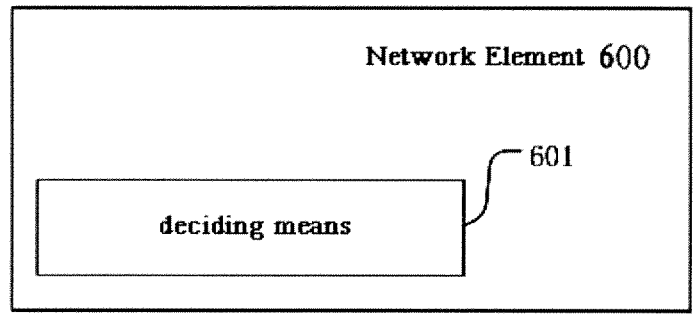
FIG. 6 is a block diagram of the access device according to an embodiment of the present invention.

FIG. 6 shows the access device 600 according to an embodiment of the present invention, which comprises deciding means 601. The deciding means 601 is configured to decide to request another network element (the source MME) for handover, upon detection of a signaling bearer while a measurement report received from the terminal meets handover condition. For example, if the measurement report received by the source E-UTRAN from the UE meets a handover condition and a signaling bearer is detected, I.e. QCI=5, then the deciding means 601 decides to send a handover request to the source MME.

In implementation, the access device 600 of this embodiment as well as the deciding means 601 it includes, may be implemented in software, hardware or a combination of them. For example, those skilled in the art are familiar with a variety of devices which may be used to implement these components, such as micro-processor, micro-controller, ASIC. PLD and/or FPGA etc.

In operation, the access device 600 of the embodiment illustrated in connection with FIG. 6, may implement the above described method for handing over a VoIP call from PS to CS during a non steady state of the VoIP call. By using this access device, the SRVCC handover procedure may be implemented during a non steady state of a call/session, thus enhancing the original SRVCC solution.

Based on the same inventive concept, according to another aspect of the present invention, a network element managing mobility of a terminal is proposed, which is capable of handing over a terminal from a packet switching domain to a circuit switching domain during a non steady state of a call.

Figure 7:
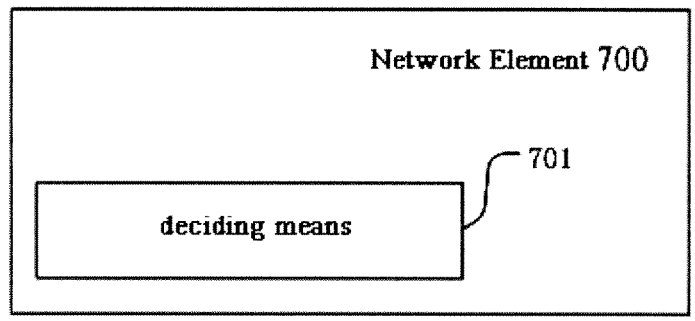
FIG. 7 is a block diagram of the network element according to an embodiment of the present invention.

FIG. 7 shows the network element 700 managing mobility of a terminal according to an embodiment of the present invention, which comprises deciding means 701. The deciding means 701 is configured to decide to send another network element a PS to CS handover request upon detection of a signaling bearer, after having received a request for handover from an access network. For example, when the source MME has received a handover request from the source E-UTRAN and detected a signaling bearer, I.e, QCI=5, the deciding means 701 decides to send to the SCC AS an INVITE message including the SDP of the STN-SR and the MGW for requesting a SRVCC handover procedure from the PS to the CS.

In implementation, the network element 700 of this embodiment as well as the deciding means 701 it includes, may be implemented in software, hardware or a combination of them. For example, those skilled in the art are familiar with a variety of devices which may be used to implement these components, such as micro-processor, micro-controller, ASIC. PLD and/or FPGA etc.

In operation, the network element 700 of the embodiment illustrated in connection with FIG. 7, may implement the above described method for handing over a VoIP call from PS to CS during a non steady state of the VoIP call. By using this network element 700, the SRVCC handover procedure may be implemented during a non steady state of a call/session, thus enhancing the original SRVCC solution.

Based on the same inventive concept, according to yet another aspect of the present invention, a communication system is also proposed, which comprises at least a terminal, the network element 500 managing service centralization and continuity described in the above embodiment, the access device 600 and the network element 700 managing mobility of a terminal. Furthermore, the communication system may also comprise other network elements, for example a MSC server etc.

For example, in the communication system of the present embodiment, the PS-CS SRVCC handover may be implemented during a non steady state of a VoIP call. The detailed operation process may refer to the above described method for handing over a VoIP call from PS to CS during a non steady state of the VoIP call according to the embodiment of the present invention, and unnecessarily detailed description thereof will not be given out any more herein.

Although the exemplary embodiments of the method for handing over a VoIP call from PS to CS during a non steady state of the VoIP call, the network element managing service centralization and continuity, the access device, the network element managing mobility of a terminal, and the communication system comprising at least a terminal, the network element managing service centralization and continuity, the access device and the network element managing mobility of a terminal of the present invention are described above in detail, the above embodiments are not exhaustive, and those skilled in the art can make numerous changes and modifications within the spirit and scope of the present invention. Therefore, the present invention is not limited to those embodiments, the scope of which is defined only by the appended claims.

The invention claimed is:

1. A method for handing over a terminal from a packet switching domain to a circuit switching domain during a non steady state of a call, the method comprising:
   a first network element anchoring the call based on a call setup request received from the terminal, and storing a provisional response returned to the terminal and the non steady state of the call, the first network element managing service centralization and continuity, wherein the non steady state of the call is a state when the call has not been completely set up, wherein the first network element is a Service Centralization and Continuity Application Server in an IMS network;
   receiving a measurement report from the terminal at an access network of the packet switching domain, the measurement report including an indication that the terminal has detected that a handover is necessary;
   the access network requesting a second network element of the packet switching domain for handover;
   the second network element sending a third network element of the circuit switching domain a packet switched to circuit switched handover request upon detection of a signaling bearer, after receiving a request for handover from the access network; and
   after reception of said packet switched to circuit switched handover request, if the first network element detects that the call is in the non steady state, then the first network element checks the previously stored provisional response and sends the provisional response to the third network element, completing a session handover procedure and updating a remote end with which the call is to be setup.

2. The method according to claim 1, wherein the handover is a single radio voice call continuity handover;
   the packet switching domain is provided by an E-TRAN network, and the circuit switching domain is provided by a GSM/EDGE Radio Access Network or UTRAN network;

information indicating using single radio voice call continuity handover is provided and comprises a Session Transfer Number for SR-VCC;
call parameters are provided using session description protocol; or
the detection of the signaling bearer means detecting that the value of a Quality Class Identifier equals 5.

3. The method according to claim 1, wherein the access network is a source Evolved UMTS Terrestrial Radio Access Network, the second network element is a source Mobility Management Entity, or the third network element is a Mobile Switch Center server.

4. The method according to claim 1, wherein the call setup request is an INVITE message, the provisional response is a 180 Ringing message or a 183 Session Progress message, or the packet switched to circuit switched handover request is an INVITE message with information indicating using single radio voice call continuity handover and call parameters.

* * * * *